(No Model.)
J. P. DIAS.
AUTOMATIC UNCOUPLER AND CAR BRAKE.
No. 520,204. Patented May 22, 1894.
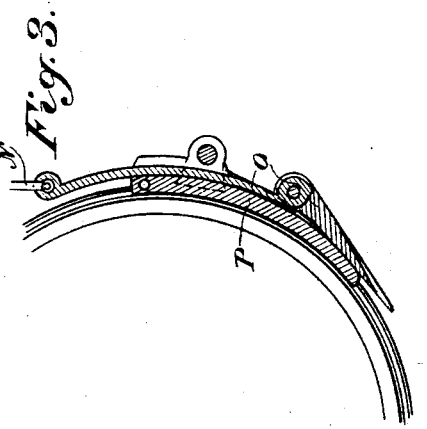
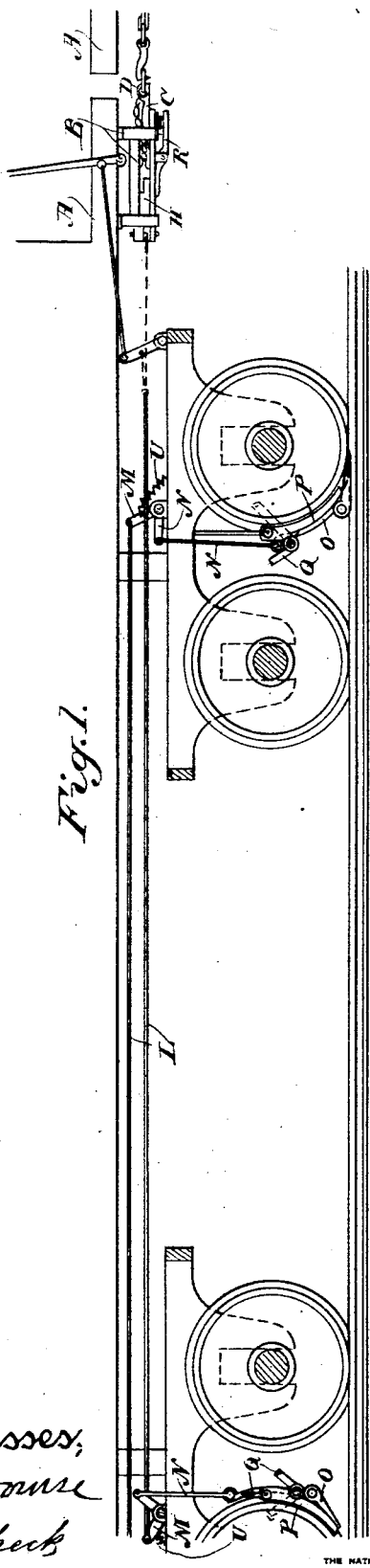
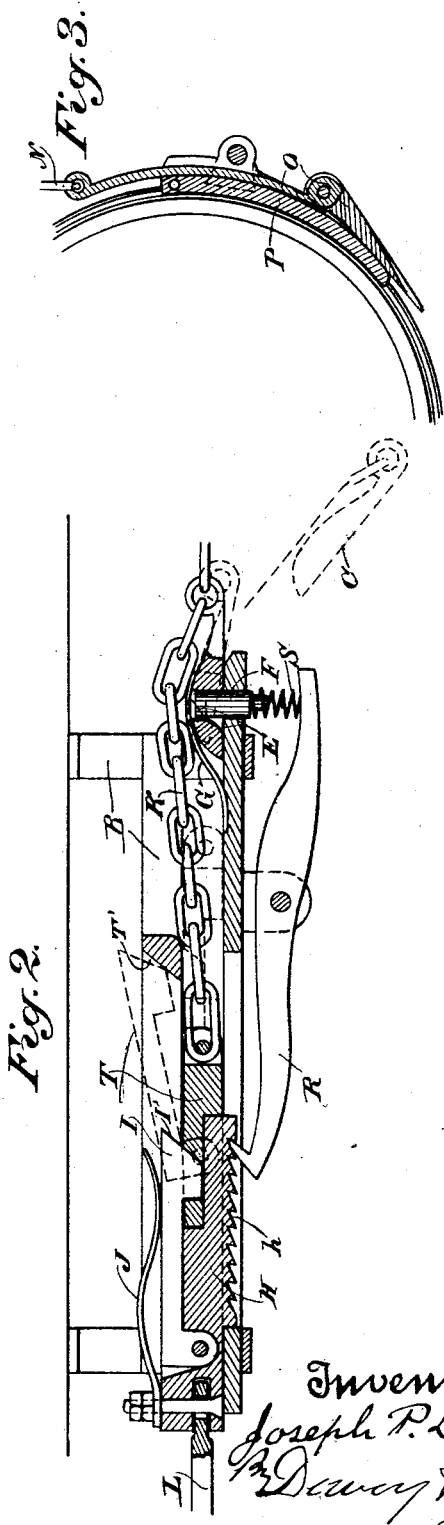
Witnesses:
Inventor,
Joseph P. Dias
By Dewey & Co.
attys

UNITED STATES PATENT OFFICE.

JOSEPH P. DIAS, OF SAN FRANCISCO, CALIFORNIA.

AUTOMATIC UNCOUPLER AND CAR-BRAKE.

SPECIFICATION forming part of Letters Patent No. 520,204, dated May 22, 1894.

Application filed February 15, 1894. Serial No. 500,282. (No model.)

*To all whom it may concern:*

Be it known that I, JOSEPH P. DIAS, a subject of the King of Portugal, residing in the city and county of San Francisco, State of California, have invented an Improvement in Automatic Uncouplers and Car-Brakes; and I hereby declare the following to be a full, clear, and exact description of the same.

My invention relates to an attachment for cars which is designed to automatically uncouple the cars when any accident happens by which the car in front becomes derailed or thrown down, and simultaneously apply a brake to the wheels of the car remaining upon the track.

It consists in certain details of construction which will be more fully explained by reference to the accompanying drawings, in which—

Figure 1 is a general view of my device. Fig. 2 is a longitudinal section through the releasing device. Fig. 3 is a section through the braking device.

A is the car platform having fixed beneath it an iron frame-work B which serves to support the mechanism of my apparatus.

The coupling (of which there may be two, one upon each side of the platform) consists of a peculiarly shaped bar or link C having a yoke D upon the front end adapted to connect with the car in front. Through this bar C is made a hole near the center, the rear side of which hole is made at a considerable angle or incline as shown at E. This link fits over a pin F which is fixed to the frame-work B attached to the car platform, and is normally held in place upon the pin by a spring G conveniently fixed to some part of the frame-work so that it presses upon the top of the coupling link or bar C and holds it normally upon the pin.

H is a bar sliding upon guides in the longitudinal part of the frame B, and I is a hook-shaped piece which is normally closed down upon the bar H by a spring J.

From the hook D at the front end of the coupling link a chain K extends back and connects with a link T which engages with the hook I and the parts are thus normally connected together.

From the rear end of the sliding bar H a connecting rod or chain L extends back with one arm of the bell-crank lever M suitably fulcrumed upon the car truck. From the other arm a connecting link N extends down and connects with the sliding shoe O which fits within a brake shoe P that is suspended from the car truck by links Q Q. Whenever the sliding bar H is moved forward, it will act through the connecting rod or chain L to oscillate the bell-crank lever M and through the connecting link N to force the movable part of the brake shoe down until it strikes the track and by its curvature is forced beneath the wheel of the car, thus acting as a shoe upon which the wheel rides, while the other portion P of the brake shoe is drawn strongly against the front of the wheel, the whole of the brake forming a curved shoe which presses against the front of the wheel and extends down beneath it so that the wheel practically rides upon the shoe, forcing it against the wheel and preventing the rotation of the latter, thus stopping the train.

The operation of the forward part of the mechanism by which this is actuated will then be as follows:—When the cars are in their normal condition coupled, the bar H is at the rear portion of the guide upon which it travels, and the bell-crank lever is in such a position that the brake shoe is held up and away from the wheel. If any accident occurs by which the forward car is thrown down, as soon as it commences to pitch downward it pulls the forward end of the link C in such a manner as to tilt it upon the pin F, and by reason of the sloping and posterior portion of the opening in which the pin lies, the link C will be turned to such an angle that it will slip off of the pin F, the spring G yielding to allow this to occur. As soon as it does slip off, it commences to pull the coupling hook I and bar H forward, thus coupling the brake by its action upon the bell-crank lever M previously described. The lower part of the bar H has a toothed rack *h* formed upon it and beneath the frame-work is a pawl lever R which is acted upon by a spring S, this spring holding point of the pawl lever in contact with the rack bar so that as the rack bar slides forward, this pawl will engage its tooth and will retain it wherever it may be drawn. Whenever the bar has been drawn forward sufficiently to cause the brake to be applied the hook I is raised so as to disengage the link which is connected with it in the following manner: The front of the hook I is beveled or inclined as is shown at I'. T' is an incline fixed in the frame B in the line of travel of the hook I and as the hook I is fulcrumed to the bar H, it will be manifest that when the coupling link C has been disengaged from the pin F, the whole of the bar H and the hook I will be drawn forward until the hook I commences to ride up the incline T', when it will disengage the coupling link T from the bar H, and this allows the part C which still remains connected with the foremost car to be disengaged, carrying with it the chain K and coupling link T which has been disengaged from the hook I. At the same instant, the brake will have been applied upon the rear car, and the pawl R will retain the sliding bar H in the forward position to which it has been drawn, thus retaining the brake in application to the wheels.

A suitable spring U acts to disengage the brake and return the parts to their normal position whenever they are released from the pawl.

Having thus described my invention, what I claim as new, and desire to secure by Letters Patent, is—

1. In a coupling device for cars adapted to be separated by a downward pull of the forward car, a longitudinally moving slide connected with the coupling link so as to be drawn forward with it when the cars are separated, a brake shoe suspended in front of the car wheels and having a supplemental curved shoe slidable in it and adapted to move down to a point between the wheel and the track, a bell-crank lever and a connection between it and the movable shoe, and a rod connecting the bell-crank lever with the movable part of the coupling whereby the brake is applied automatically when the coupling is disengaged, substantially as herein described.

2. In a car coupling, a link or bar adapted to engage a stationary pin upon the car held in contact therewith by a spring, a bar slidable longitudinally upon the frame of the coupling having a spring-actuated hook fulcrumed thereto, a chain and link connecting the coupling at the forward end with the hook, a rod extending rearwardly from the sliding bar connecting with a bell-crank lever fulcrumed to the car truck whereby the movement of the slide and its rod will oscillate the bell-crank lever, and a brake shoe connected and movable with the bell-crank lever whereby the shoe is forced beneath and in contact with the car wheel by the oscillation of the lever as described.

3. The combination of a stationary coupling pin attached to the frame and guides, a link adapted to engage said pin and a spring by which it is retained in engagement, said link having an inclined posterior side of the opening whereby the tilting downward of the front end of the link will raise the spring and disengage the link from the pin, a chain extending rearwardly from the link and connected with the hook which is movably fulcrumed upon a longitudinally sliding bar traveling in guides upon the frame, a rod connecting said bar with the bell-crank lever which acts to apply the brake, a toothed rack formed upon said bar and a pawl mechanism engaging said rack and retaining the parts in position to which they are advanced when the brake has been applied as described.

4. The combination of a coupling link engaging a stationary pin upon the car and retained in place by a spring, said link having an opening fitting over the pin and adapted to be disengaged therefrom when the link is tilted downward, a chain connected with the link and with a spring-actuated hook fulcrumed upon a longitudinally sliding bar which travels in guides upon the frame-work of the device, a rod connecting the sliding bar with the brake, an actuating bell-crank lever whereby the brake is applied when the bar is drawn forward, a pawl and ratchet mechanism by which the bar is retained in the advanced position after it has been drawn forward and an inclined disengaging piece over which the fulcrumed hook passes when the bar is drawn forward whereby the hook is lifted to disengage the coupling chain and allow it and the coupling link to be dragged away by the car in front without disturbing the car to which this device is attached, substantially as described.

In witness whereof I have hereunto set my hand.

JOSEPH P. DIAS.

Witnesses:
S. H. NOURSE,
GEO. H. STRONG.